United States Patent [19]

Haisch

[11] 3,773,007

[45] Nov. 20, 1973

[54] BUMPER FOR SHIP'S HULL

[75] Inventor: Richard A. Haisch, Clark, N.J.

[73] Assignee: Esso Research and Engineering, Linden, N.J.

[22] Filed: June 25, 1971

[21] Appl. No.: 156,885

[52] U.S. Cl. ............................................. 114/219
[51] Int. Cl. ........................................... B63b 59/02
[58] Field of Search ................. 114/219; 293/71 P, 293/71 R; 73/146.4

[56] References Cited
UNITED STATES PATENTS

| | | | |
|---|---|---|---|
| 3,283,734 | 11/1966 | Gorman | 114/74 A |
| 3,584,464 | 6/1971 | Saadeh | 114/219 |
| 2,235,716 | 3/1941 | Lucius | 73/146.4 |
| 1,361,902 | 12/1920 | Porteous | 114/219 |
| 3,473,836 | 10/1969 | Halter | 114/219 X |
| 991,224 | 5/1911 | Morauszky | 114/219 |
| 2,089,500 | 8/1937 | Ochaploski | 293/71 P |

Primary Examiner—Milton Buchler
Assistant Examiner—Gregory W. O'Connor
Attorney—F. Donald Paris et al.

[57] ABSTRACT

An arrangement and construction for a pneumatic bumper mechanically fastened to a ship's hull or over an external insulation system for a ship to absorb impacts as may result from docking and to prevent damage to the ship's structure or external insulation system. The bumper is filled with a suitable gaseous material and is disposed along the sides of the ship so as to cover the waterline area.

5 Claims, 2 Drawing Figures

PATENTED NOV 20 1973
3,773,007
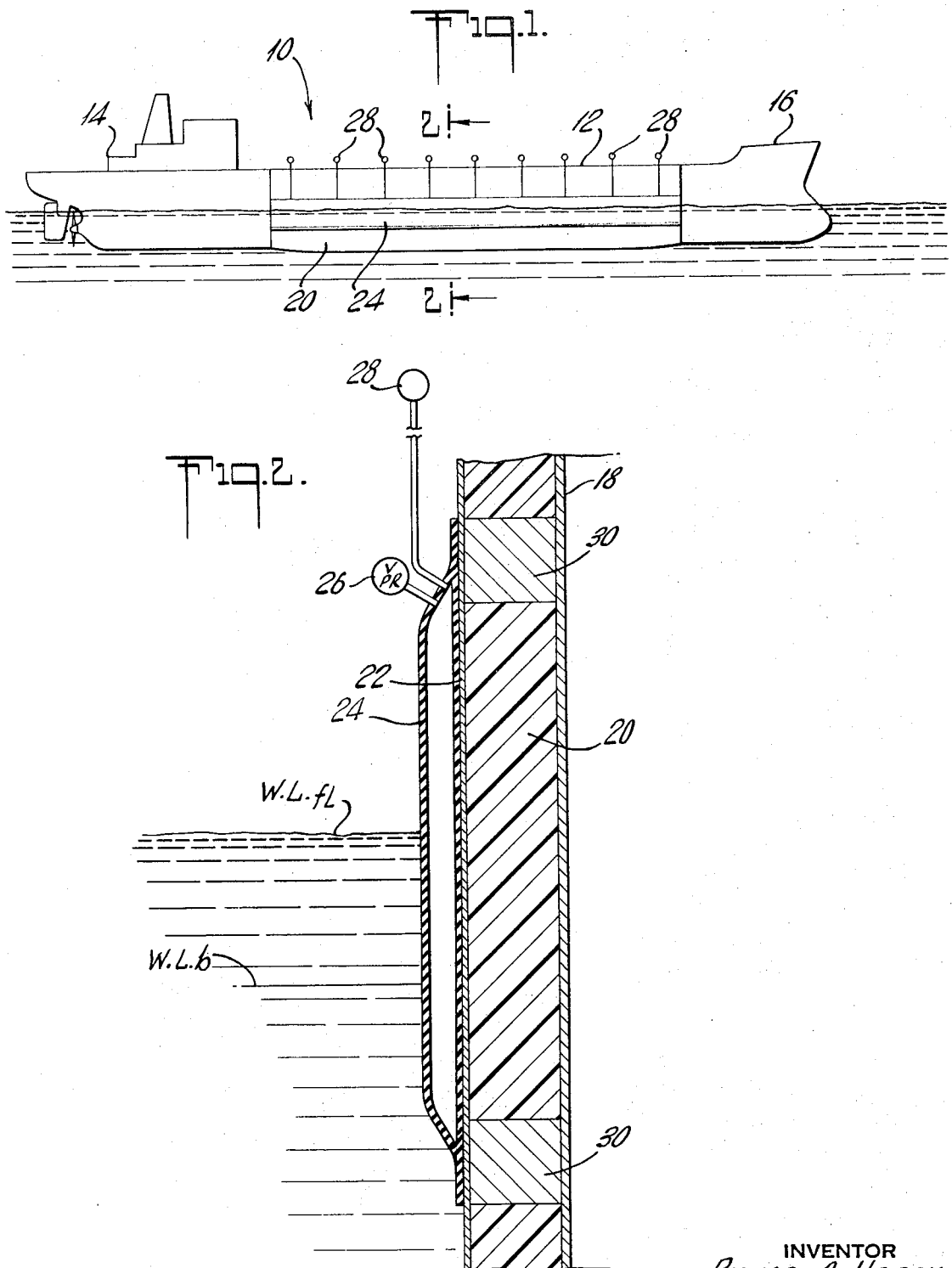
INVENTOR
RICHARD A. HAISCH
BY
ATTORNEY

BUMPER FOR SHIP'S HULL

CROSS-REFERENCE TO RELATED APPLICATIONS AND PATENTS

While the present invention has utility in connection with conventional ship structures and tug boats, it has been disclosed herein typically in an externally insulated ship such as disclosed in the Gorman U. S. Pat. No. 3,283,734, assigned to the same assignee as the present application and in U. S. Patent Application Ser. No. 144,422 filed May 18, 1971 (Rm-613), which discloses an arrangement and construction for securing external insulation to the ship's hull, which latter application is assigned to the same assignee as that of the present application.

BACKGROUND OF THE INVENTION

The present invention relates to a novel and improved bumper construction for a ship.

The present invention is directed towards providing a novel construction and arrangement of a bumper of the pneumatic type wherein the bumper comprises a preformed flexible envelope made from a suitable material such as reinforced butyl rubber. In the preferred embodiment of the invention the envelope is secured externally of the insulation so as to cover the waterline area of the ship and is filled with a gas such that it will absorb impacts such as may occur during docking and prevent damage to the external insulation system. While the pneumatic bumper has been disclosed for use on an externally insulated tanker, it is contemplated that a bumper constructed and arranged according to the teachings of this disclosure has utility on conventional ships not employing an external insulation system, and as the bumper for a tug boat. According to the preferred embodiment, the envelope is longitudinally disposed along the sides of the vessel so as to extend for the length of the external insulation. To provide complete protection during docking operations the bumper extends vertically from below the ballast waterline to above the full load waterline.

Thus, it is a primary object of the invention to provide a novel and improved bumper construction and arrangement for a ship, tug boat and the like.

It is a further object of the present invention to provide a novel construction and arrangement of a pneumatic bumper for a ship, tug boat and the like.

Having in mind these and various other objects that will be evident from an understanding of this disclosure, the present invention comprises the combinations and arrangements as illustrated in the presently preferred embodiment of the in-vention, which is hereinafter set forth in such detail as to enable those skilled in the art readily to understand the func-tion, operation, construction and advantages of it when read in conjunction with the accompanying drawings.

BRIEF DESCRIPTION OF THE DRAWINGS

FIG. 1 is an outboard profile view of an externally insulated tanker incorporating the present invention; and FIG. 2 is an enlarged cross-sectional view taken substantially on the line 2—2 of FIG. 1 illustrating structural details of the present invention.

DESCRIPTION OF THE PREFERRED EMBODIMENT

Having reference to the drawings, the present invention is illustrated in FIG. 1 as embodied in an externally insulated tanker typically having a nickel-steel plate hull at its midbody with reference being made to the aforementioned Gorman U.S. Pat. No. 3,283,734 for a more complete and detailed explanation thereof. Also, reference may be had to the aforementioned U. S. Patent Application Ser. No. 144,422 (RM-613) for details as to the securement of the external insulation to the ship's hull.

FIG. 1 illustrates a tanker 10 including a cargo-carrying midbody 12, a stern 14, and a forward hull portion or bow 16, all of which are fabricated in a conventional manner. The hull plating 18 is of a material which possesses the physical and mechanical properties compatible with the particular cargo to be carried. A typical material might comprise nickel-steel containing substantially 9 percent nickel. As shown, the midbody is completely enveloped or clad externally with a suitable external insulation 20. The external insulation 20 is provided with an outer protective covering 22 which is both water-resistant and abrasion-proof.

According to the preferred embodiment of the presnt invention, there is provided a preformed flexible envelope 24 made from a suitable material such as reinforced butyl rubber. The envelope extends from below the ballast waterline $WL_b$ to above the full load waterline $WL_{fl}$ so that in either condition there is provided adequate protection to absorb any impact. The envelope is filled with a suitable gas and also is provided with relief valve 26 that will limit the loads transmitted to the external insulation. Thus, when a force above a predetermined value is applied to the envelope 24 the valve will become operable to provide relief in the case of an excessive envelope pressure due to the impact. A plurality of pressure gauge indicators 28 may be provided along the length of the envelope 24 extending upward to the deck so that there is ready indication of whether any damage has occurred to the envelope. There is shown in FIG. 2 load bearing insulation members 30 which are suitably secured to the hull 18 and provide a means for securing the envelope to the insulation. Thus, a preferred way of attaching the envelope in place would be by mechanically fastening it to the ship's load bearing blocks or directly to the ship's hull by suitable means such as bolts and the like.

It will be appreciated from the foregoing description that there has been provided a novel and improved construction and arrangement of a pneumatic bumper for an externally insulated ship. However, it should be understood that the specific constructions and arrangements herein illustrated and described are intended to be representative of a preferred embodiment only, and that certain changes may be made therein without departing from the clear teachings of the present disclosure. Thus, for example, while the bumper is illustrated as a comprising single envelope, the envelope may comprise a plurality of individual segments secured to each other in a sealed fashion so that leakage of the gas contained therein does not result. Accordingly, reference should be made to the following appended claims in determining the full scope of the invention.

Having thus set forth the nature of this invention, what is claimed herein is:

1. An externally insulated tanker for the transportation of liquid cargoes comprising, in combination, a hull including a cargo-carrying midbody, thermal insulation means secured to the exterior of said hull in the area of said midbody, pneumatic bumper means disposed on each of the sides of said hull externally of said thermal insulation for absorbing any impact that may be applied thereto during docking, said bumper means comprising a sealed envelope which defines a hollow unobstructed compartment and extending vertically from below the ballast waterline of said tanker to above the full load waterline of said tanker, means for providing an indication of damage to said bumper means, and relief valve means operably connected with said bumper means for limiting loads transmitted to said thermal insulation.

2. An externally insulated tanker according to claim 1 wherein said bumper means comprises a gas-filled envelope made from reinforced butyl rubber.

3. An externally insulated tanker according to claim 1 wherein said indicating means comprises pressure gauges operably connected with said bumper means to provide an indication of any damage to said bumper.

4. A waterborne vessel such as a ship, tug boat and the like comprising, in combination, a hull, pneumatic bumper means secured for a predetermined length on each of the sides of said hull for absorbing any impact that may be applied thereto, said bumper means comprising a sealed envelope which defines a single hollow compartment and extending vertically from below the ballast waterline of said vessel to above the full load waterline of said vessel, relief valve means operably connected with said bumper means for limiting loads transmitted to said hull and means comprising a plurality of spaced pressure gauges for providing an indication of damage to said bumper means.

5. A waterborne vessel according to claim 4 wherein said bumper means comprises a gas-filled envelope made from reinforced butyl rubber.

* * * * *